(12) United States Patent
Iwamoto et al.

(10) Patent No.: US 12,233,710 B2
(45) Date of Patent: Feb. 25, 2025

(54) DRIVE DEVICE

(71) Applicant: TOYOTA JIDOSHA KABUSHIKI KAISHA, Toyota (JP)

(72) Inventors: Masataka Iwamoto, Toyota (JP); Koichi Okuda, Toyota (JP); Atsushi Tabata, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 18/581,569

(22) Filed: Feb. 20, 2024

(65) Prior Publication Data
US 2024/0408959 A1     Dec. 12, 2024

(30) Foreign Application Priority Data

Jun. 12, 2023    (JP) .................... 2023-096108

(51) Int. Cl.
*B60K 17/04*      (2006.01)
*B60K 7/00*       (2006.01)
*F16H 1/20*       (2006.01)
*F16H 57/04*      (2010.01)

(52) U.S. Cl.
CPC .......... *B60K 17/043* (2013.01); *B60K 7/0007* (2013.01); *F16H 1/203* (2013.01); *F16H 1/206* (2013.01); *F16H 57/043* (2013.01); *B60K 2007/0076* (2013.01)

(58) Field of Classification Search
CPC .. F16H 2200/0021; B60K 1/02; B60K 7/0007
See application file for complete search history.

(56) References Cited

U.S. PATENT DOCUMENTS

| | | | |
|---|---|---|---|
| 7,854,674 B2* | 12/2010 | Freudenreich | B60K 17/08 475/5 |
| 9,457,658 B2* | 10/2016 | Knoblauch | B60L 15/2036 |
| 10,759,275 B2* | 9/2020 | Uchida | F16H 1/28 |
| 2024/0017607 A1 | 1/2024 | Masuda et al. | |

FOREIGN PATENT DOCUMENTS

| | | |
|---|---|---|
| CN | 206708313 U | 12/2017 |
| JP | 2024-010456 A | 1/2024 |

OTHER PUBLICATIONS

Yuto Masuda et al., U.S. Appl. No. 18/347,066, filed Jul. 5, 2023 (Published as US 2024/0017607 A1).

* cited by examiner

*Primary Examiner* — Jake Cook
(74) *Attorney, Agent, or Firm* — SoraIP, Inc.

(57) ABSTRACT

The drive device comprises first and second motors comprising respective first and second rotary shafts. The drive device comprises first and second counter shafts connected to each of the first and second rotary shafts via first and second counter gears. The drive device comprises first and second transmission shafts connected to each of the first and second counter shafts via third and fourth counter gears. The drive device comprises first and second drive shafts connected to each of the first and second transmission shafts via first and second hypoid gears. The first and second rotary shafts are located between the first and second counter shafts with respect to the vehicle width direction. The first and second transmission shafts are located between the first and second counter shafts in the vehicle width direction.

5 Claims, 4 Drawing Sheets

DRIVE DEVICE

CROSS-REFERENCE TO RELATED APPLICATION

This application claims priority to Japanese Patent Application No. 2023-096108 filed on Jun. 12, 2023, incorporated herein by reference in its entirety.

BACKGROUND

1. Technical Field

The technology disclosed herein relates to a drive device for a vehicle.

2. Description of Related Art

A drive device for a vehicle disclosed in Chinese Examined Utility Model Registration Application Publication No. 206708313 includes two independent motors for driving right and left wheels, respectively. The two motors include a pair of rotary shafts extending in a front-rear direction of the vehicle. The rotary shafts are connected to a pair of transmission shafts via single counter gears. The transmission shafts are connected to a pair of drive shafts via hypoid gears. The drive shafts extend in a vehicle width direction of the vehicle. Wheels are connected to the ends of the drive shafts.

SUMMARY

In the drive device of Chinese Examined Utility Model Registration Application Publication No. 206708313, it may be difficult to sufficiently increase the reduction ratio because only the single counter gear is used. When a counter gear is added to sufficiently increase the reduction ratio, the size of the drive device may increase in the vehicle width direction.

A drive device disclosed herein is a drive device for a vehicle. The drive device includes a first motor including a first rotary shaft extending in a front-rear direction of the vehicle. The drive device includes a second motor including a second rotary shaft extending in the front-rear direction of the vehicle. The drive device includes a first counter shaft disposed parallel to the first rotary shaft and connected to the first rotary shaft via a first counter gear. The drive device includes a second counter shaft disposed parallel to the second rotary shaft and connected to the second rotary shaft via a second counter gear. The drive device includes a first transmission shaft disposed parallel to the first counter shaft and connected to the first counter shaft via a third counter gear. The drive device includes a second transmission shaft disposed parallel to the second counter shaft and connected to the second counter shaft via a fourth counter gear. The drive device includes a first drive shaft extending in a vehicle width direction of the vehicle and including one end connected to the first transmission shaft via a first hypoid gear and another end connected to a left wheel. The drive device includes a second drive shaft extending in the vehicle width direction of the vehicle and including one end connected to the second transmission shaft via a second hypoid gear and another end connected to a right wheel. In a plan view in a vertical direction of the vehicle, the first rotary shaft and the second rotary shaft are positioned between the first counter shaft and the second counter shaft in the vehicle width direction of the vehicle. The first transmission shaft and the second transmission shaft are positioned between the first counter shaft and the second counter shaft in the vehicle width direction of the vehicle.

The counter gear includes a pair of gears meshing with each other. In the above structure, power of the first rotary shaft can be transmitted to the first transmission shaft via the two counter gears that are the first counter gear and the third counter gear. Similarly, power of the second rotary shaft can be transmitted to the second transmission shaft via the two counter gears that are the second counter gear and the fourth counter gear. The reduction ratio can be increased as compared with the case where the power is transmitted by using only a single counter gear. The first transmission shaft and the second transmission shaft are positioned between the first counter shaft and the second counter shaft in the vehicle width direction of the vehicle. Thus, it is possible to reduce the size of the drive device in the vehicle width direction while sufficiently increasing the reduction ratio.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Additional features of the drive device disclosed herein are listed below.

The first rotary shaft and the first transmission shaft may be located coaxially. The second rotary shaft and the second transmission shaft may be located coaxially.

The first rotary shaft and the second rotary shaft may be hollow. The first transmission shaft may include one end inserted into the first rotary shaft. The second transmission shaft may include one end inserted into the second rotary shaft.

According to the above configuration, it is possible to suppress the amount of projection of the first transmission shaft and the second transmission shaft in the vehicle front-rear direction. It is possible to reduce the size of the drive device.

The first transmission shaft and the second transmission shaft may be hollow. The drive device may further include a first oil seal that seals between an outer circumferential surface of the first transmission shaft and an inner circumferential surface of the first rotary shaft. The drive device may further include a second oil seal that seals between an outer circumferential surface of the second transmission shaft and an inner circumferential surface of the second rotary shaft. A first oil passage may be formed by the first rotary shaft and the first transmission shaft. A second oil passage may be formed by the second rotary shaft and the second transmission shaft.

According to the above configuration, it is possible to lubricate and cool the rotary shaft and the transmission shaft by using the common lubricating oil. It is possible to efficiently circulate the lubricating oil.

The first hypoid gear may include a first drive gear fixed to the first transmission shaft and a first side gear fixed to the first drive shaft. The second hypoid gear may include a second drive gear fixed to the second transmission shaft and a second side gear fixed to the second drive shaft. In a plan view of the vehicle in the up-down direction, the first side gear and the second side gear may be positioned between the first transmission shaft and the second transmission shaft in the vehicle width direction.

According to the above configuration, it is possible to reduce the size of the drive device in the vehicle width direction in the region where the first and second hypoid gears are disposed.

Schematic Configuration of the Drive Device 10

Figure 1:
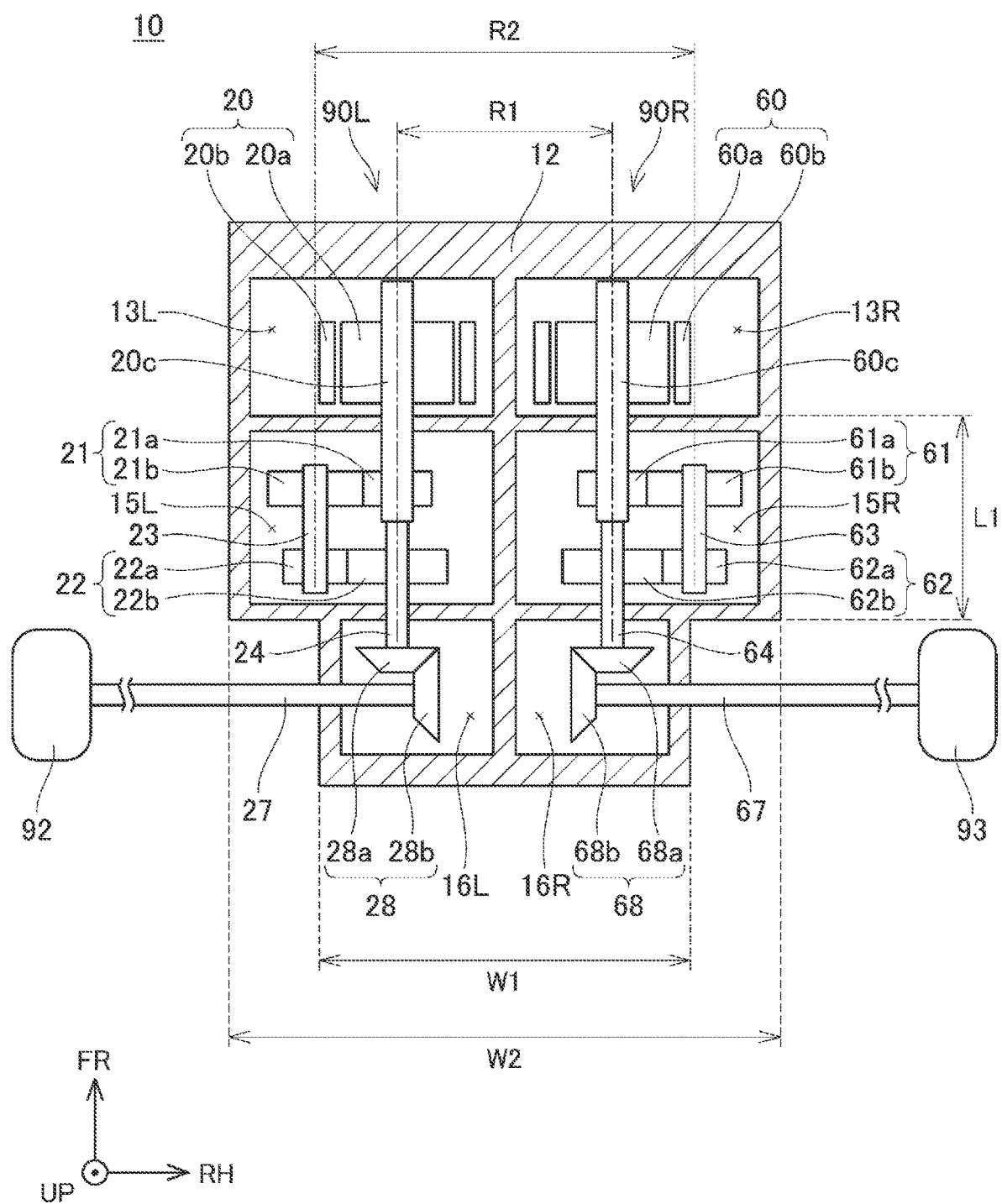
FIG. 1 is a diagram illustrating a schematic configuration of a drive device 10.

FIG. 1 shows a schematic configuration of a drive device 10 according to the present embodiment. FIG. 1 is a plan view of a vehicle viewed from above. In FIG. 1, an arrow FR indicates a vehicle forward direction, an arrow RH indicates a vehicle rightward direction, and an arrow UP indicates a vehicle upward direction. The same applies to other drawings.

The drive device 10 includes a case 12. Inside the case 12, a left motor chamber 13L and a right motor chamber 13R, a left counter gear chamber 15L and a right counter gear chamber 15R, a left hypoid gear chamber 16L and a right hypoid gear chamber 16R are provided. A left drive system 90L is disposed inside the left motor chamber 13L, the left counter gear chamber 15L, and the left hypoid gear chamber 16L. A right drive system 90R is disposed inside the right motor chamber 13R, the right counter gear chamber 15R, and the right hypoid gear chamber 16R. The left drive system 90L and the right drive system 90R are symmetrical. Therefore, the left drive system 90L is mainly described below in some cases.

Left drive system 90L will be described. The first motor 20 is housed in the left motor chamber 13L. The first motor 20 includes a rotary shaft 20c extending in the front-rear direction of the vehicle. The counter shaft 23 and the transmission shaft 24 are accommodated in the left counter gear chamber 15L. The counter shaft 23 is arranged parallel to the rotary shaft 20c. The counter shaft 23 is connected to the rotary shaft 20c via a counter gear 21. The counter gear 21 includes a gear 21a fixed to the rotary shaft 20c and a gear 21b fixed to the counter shaft 23.

The transmission shaft 24 is arranged parallel to the counter shaft 23 and is coaxial with the rotary shaft 20c. The transmission shaft 24 is connected to the counter shaft 23 via a counter gear 22. The counter gear 22 includes a gear 22a fixed to the counter shaft 23 and a gear 22b fixed to the transmission shaft 24.

The left hypoid gear chamber 16L houses a drive shaft 27 extending in the vehicle-width direction. An end portion of the drive shaft 27 inside the vehicle is connected to the transmission shaft 24 via a hypoid gear 28. The hypoid gear 28 includes a drive gear 28a fixed to the transmission shaft 24 and a side gear 28b fixed to the drive shaft 27. An end portion of the drive shaft 27 on the vehicle outer side is connected to the left rear wheel 92.

The right drive system 90R will be described. The second motor 60 is housed in the right motor chamber 13R. The second motor 60 includes a rotary shaft 60c extending in the front-rear direction of the vehicle. The counter shaft 63 and the transmission shaft 64 are accommodated in the right counter gear chamber 15R. The counter shaft 63 is arranged parallel to the rotary shaft 60c. The counter shaft 63 is connected to the rotary shaft 60c via a counter gear 61. The counter gear 61 includes a gear 61a fixed to the rotary shaft 60c and a gear 61b fixed to the counter shaft 63.

The transmission shaft 64 is arranged parallel to the counter shaft 63 and is coaxial with the rotary shaft 60c. The transmission shaft 64 is connected to the counter shaft 63 via a counter gear 62. The counter gear 62 includes a gear 62a fixed to the counter shaft 63 and a gear 62b fixed to the transmission shaft 64.

A drive shaft 67 extending in the vehicle-width direction is accommodated in the right hypoid gear chamber 16R. An end portion of the drive shaft 67 inside the vehicle is connected to the transmission shaft 64 via a hypoid gear 68. The hypoid gear 68 includes a drive gear 68a fixed to the transmission shaft 64 and a side gear 68b fixed to the drive shaft 67. An end portion of the drive shaft 67 on the vehicle outer side is connected to the right rear wheel 93.

Positional Relationship

In FIG. 1, the area between the counter shafts 23 and 63 is defined as the area R2. The rotary shaft 20c and 60c are located in the area R2. Transmission shafts 24 and 64 are also located in the area R2.

In FIG. 1, the area between the transmission shafts 24 and 64 is defined as the area R1. The side gears 28b and 68b are located in the area R1.

A vehicle width-direction width of the case 12 defining the left hypoid gear chamber 16L and the right hypoid gear chamber 16R is defined as a width W1. Further, a width in the vehicle width direction of the case 12 defining the left counter gear chamber 15L and the right counter gear chamber 15R is defined as a width W2. The width W1 is smaller than the width W2.

Specific Configuration of the Left Drive System 90L

Figure 2:
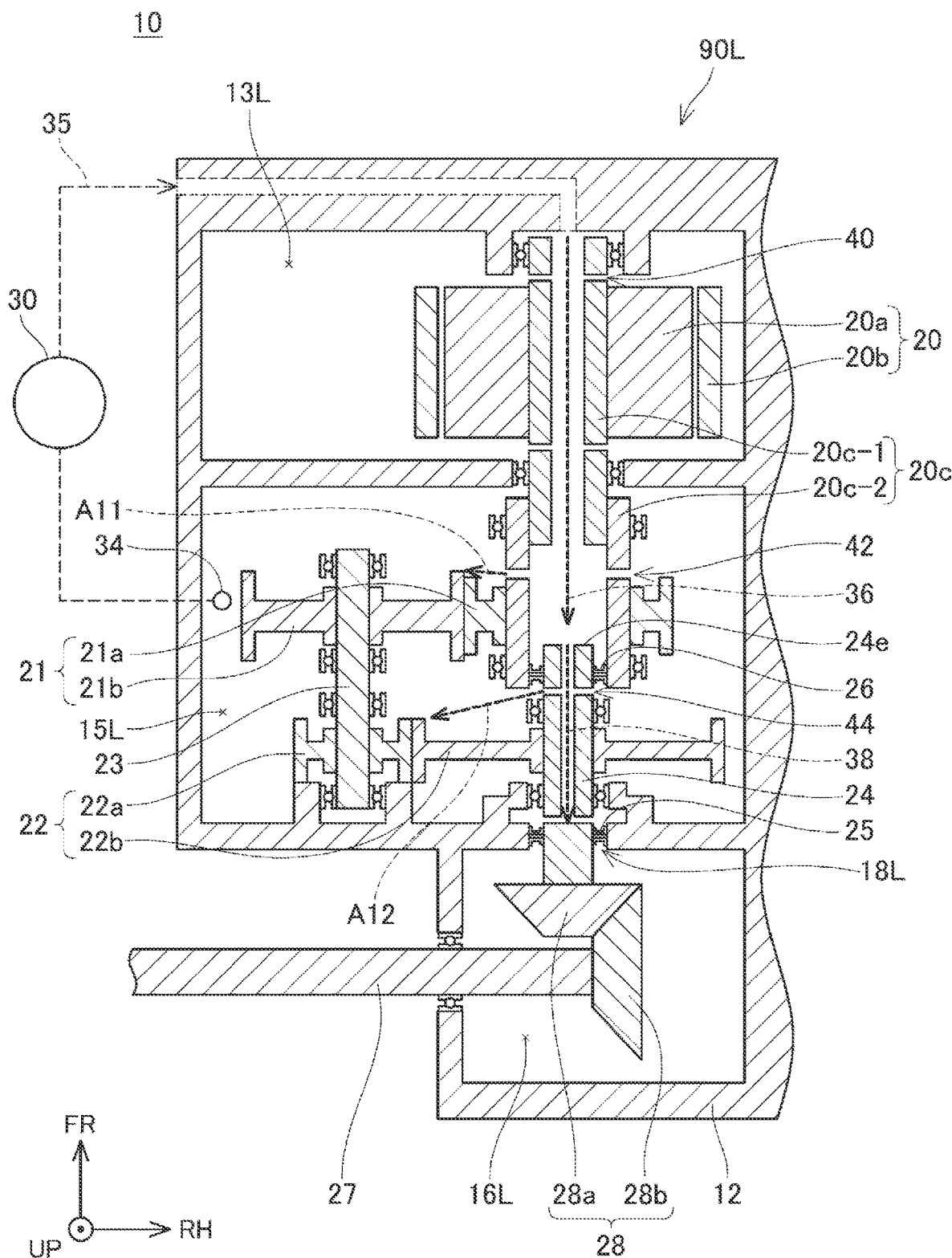
FIG. 2 is an enlarged cross-sectional view of the left drive system 90L.

A specific configuration of the left drive system 90L will be described with reference to FIG. 2. FIG. 2 is an enlarged cross-sectional view of the left drive system 90L. The first motor 20 includes a rotor 20a and a stator 20b. The stator 20b is disposed around the rotor 20a. The rotor 20a has a rotary shaft 20c. The rotary shaft 20c has a motor shaft 20c-1 and an intermediate shaft 20c-2. The motor shaft 20c-1 and the intermediate shaft 20c-2 each have a cylindrical configuration. That is, the rotary shaft 20c is hollow. A portion of the motor shaft 20c-1 is located within the first motor 20. The rear end of the motor shaft 20c-1 is inserted into the distal end of the intermediate shaft 20c-2. The motor shaft 20c-1 is fixed to the intermediate shaft 20c-2 by spline-fitting.

The counter shaft 23 and the transmission shaft 24 are rotatably indicated by bearings provided in the case 12. The transmission shaft 24 is disposed behind the rotary shaft 20c. The transmission shaft 24 extends coaxially with the rotary shaft 20c. More specifically, the central axis of the transmission shaft 24 coincides with an extension of the central axis of the rotary shaft 20c. The front end 24e of the transmission shaft 24 is inserted into the central hole of the rotary shaft 20c from the rear end of the rotary shaft 20c. A gap between the outer peripheral surface of the transmission shaft 24 and the inner peripheral surface of the rotary shaft 20c is sealed by an oil seal 26.

The rear end of the transmission shaft 24 extends from the left counter gear chamber 15L to the left hypoid gear chamber 16L through the through hole 18L. A gap between the outer peripheral surface of the transmission shaft 24 and the inner peripheral surface of the through-hole 18L is sealed by an oil seal 25.

The drive device 10 includes an oil circulation oil passage 35. An oil pump 30 is provided in the oil circulation oil passage 35. An upstream end of the oil circulation oil passage 35 is connected to the oil suction port 34. The oil suction port 34 is disposed at the bottom of the left counter gear chamber 15L. As described above, the rotary shaft 20c has a cylindrical configuration. A shaft oil passage 36 is formed by the central hole of the rotary shaft 20c (see dotted arrows). A downstream end of the oil circulation oil passage 35 is connected to a front end of the shaft oil passage 36.

The motor shaft 20c-1 is provided with a plurality of motor oil holes 40. The motor oil hole 40 extends from the shaft oil passage 36 to the outer peripheral surface of the rotary shaft 20c. The intermediate shaft 20c-2 is provided with a plurality of first oil holes 42. The first oil hole 42 extends from the shaft oil passage 36 to the outer peripheral surface of the intermediate shaft 20c-2.

Inside the transmission shaft 24, a shaft oil passage 38 extending along its central axis is provided (see dotted arrows). A front end of the shaft oil passage 38 is connected to the shaft oil passage 36. That is, the shaft oil passage 36 of the rotary shaft 20c and the shaft oil passage 38 of the transmission shaft 24 form a common oil passage. The transmission shaft 24 is provided with a plurality of second oil holes 44. The second oil hole 44 extends from the shaft oil passage 38 to the outer peripheral surface of the transmission shaft 24.

During operation of the first motor 20, the oil pump 30 operates. When the oil pump 30 is operated, the lubricating oil stored in the bottom portion of the left counter gear chamber 15L is supplied to the shaft oil passage 36 in the rotary shaft 20c via the oil suction port 34 and the oil circulation oil passage 35. The lubricating oil flows rearward through the shaft oil passage 36. The first motor 20 is cooled by the lubricating oil flowing in the shaft oil passage 36. A portion of the lubricating oil in the shaft oil passage 36 is discharged from the motor oil hole 40 and the first oil hole 42. The first motor 20 is lubricated by the lubricating oil discharged from the motor oil hole 40. As indicated by the dotted arrow A11, the counter gear 21 is lubricated and cooled by the lubricating oil discharged from the first oil hole 42.

The lubricating oil flowing to the rear end in the shaft oil passage 36 flows into the shaft oil passage 38 in the transmission shaft 24. A portion of the lubricating oil in the shaft oil passage 38 is discharged from the second oil hole 44. As indicated by the dotted arrow A12, the counter gear 22 is lubricated and cooled by the lubricating oil discharged from the second oil hole 44.

Specific Configuration of the Right Drive System 90R

Figure 3:
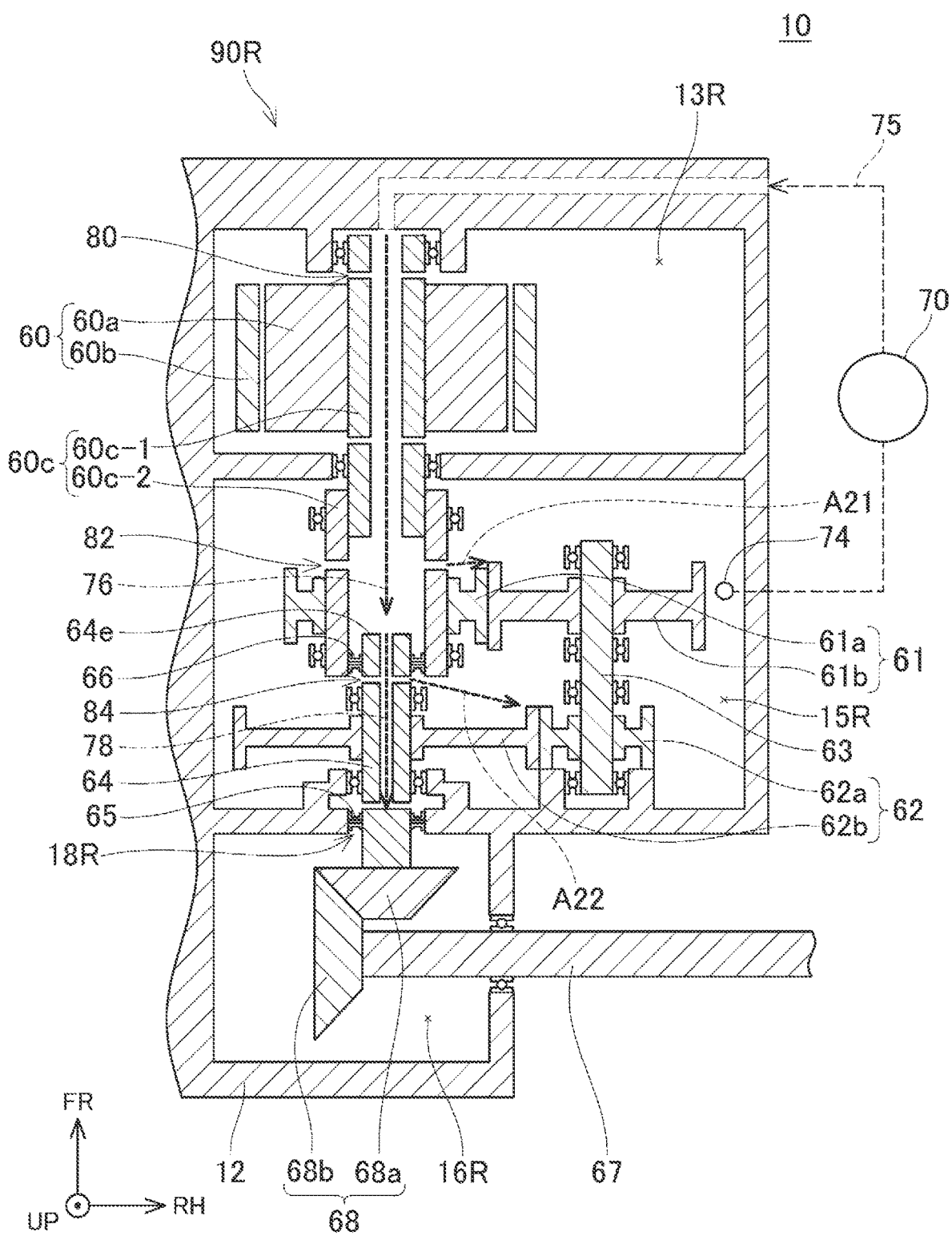
FIG. 3 is an enlarged cross-sectional view of the right drive system 90R.

A specific configuration of the right drive system 90R will be described with reference to FIG. 3. FIG. 3 is an enlarged cross-sectional view of the right drive system 90R. The right drive system 90R of FIG. 3 is symmetrical to the left drive system 90L of FIG. 2. Therefore, the configuration of the right drive system 90R is the same as the configuration of the left drive system 90L described above.

That is, the right drive system 90R includes a second motor 60, a motor shaft 60c-1, an intermediate shaft 60c-2, counter gears 61 and 62, a counter shaft 63, a transmission shaft 64, oil seals 65 and 66, a drive shaft 67, and a hypoid gear 68. The right drive system 90R includes an oil pump 70, an oil suction port 74, an oil circulation oil passage 75, shaft oil passages 76 and 78, a motor oil hole 80, a first oil hole 82, and a second oil hole 84. The counter gear 61 is lubricated and cooled by the lubricating oil discharged from the first oil hole 82 (see the dotted arrow A21). In addition, the counter gear 62 is lubricated and cooled by the lubricating oil discharged from the second oil hole 84 (see the dotted arrow A22). Note that the specific contents of the respective members included in the right drive system 90R are the same as the contents of the left drive system 90L described above, and thus detailed explanation thereof is omitted.

Effects

Figure 4:
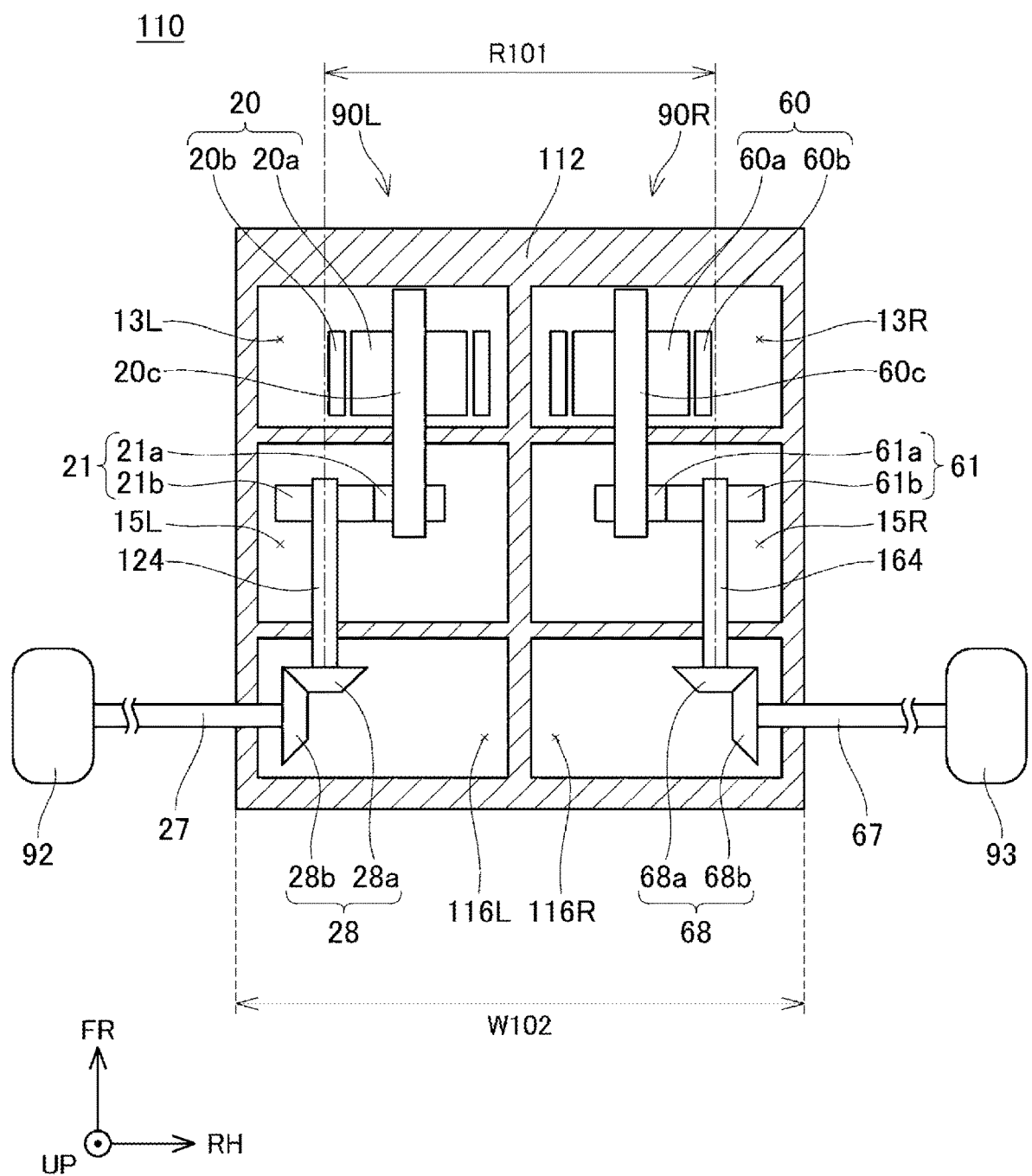
FIG. 4 is a diagram illustrating a schematic configuration of a drive device 110 of comparative embodiment.

Problems will be described using the drive device 110 of the comparative example shown in FIG. 4. In the drive device 110 of the comparative example, parts common to the drive device 10 (FIG. 1) of the present embodiment are denoted by the same reference numerals. The drive device 110 of the comparative example includes transmission shafts 124 and 164. The front end of each of the transmission shafts 124 and 164 is connected to the rotary shaft 20c and 60c via counter gears 21 and 61. The rear end of each of the transmission shafts 124 and 164 is connected to the drive shafts 27 and 67 via hypoid gears 28 and 68. In the drive device 110 of the comparative embodiment, the left drive system 90L is decelerated using only one of the counter gears 21, and the right drive system 90R is decelerated using only one of the counter gears 61. There is also an area R101 between the transmission shafts 124 and 164 in the vehicle-width direction. In addition, a width of the case 112 defining the left hypoid gear chamber 116L and the right hypoid gear chamber 116R in the vehicle width direction is a width W102.

On the other hand, in the left drive system 90L of the drive device 10 (FIG. 1) of the present embodiment, the power of the rotary shaft 20c can be reduced via two of the counter gear 21 and the counter gear 22. Similarly, in the right drive system 90R, the power of the rotary shaft 60c can be reduced via two of the counter gear 61 and the counter gear 62. The reduction ratio can be increased as compared with the drive device 110 of the comparative example in which the speed is reduced by using only one counter gear. In the drive device 10 of the present embodiment, the transmission shafts 24 and 64 are located in an area R2 between the counter shafts 23 and 63. Accordingly, the area R1 of the drive device 10 of the present embodiment can be made smaller than the area R101 of the drive device 110 of the comparative example. That is, the drive device 10 of the present embodiment can make the distance between the transmission shafts in the vehicle width direction smaller than the drive device 110 of the comparative example. Therefore, the width of the hypoid gear chamber can be reduced to the width W1 of the present embodiment as compared with the width W102 of the comparative example. As described above, it is possible to suppress the size of the drive device 10 in the vehicle width direction while sufficiently increasing the reduction ratio.

In the drive device 10 of the present embodiment, the side gears 28b and 68b are located in an area R1 between the transmission shafts 24 and 64. Therefore, it is possible to suppress the side gear 28b and 68b from interfering with the outer wall of the hypoid gear chamber. As a result, the width W1 of the hypoid gear chamber can be reduced.

As shown in FIG. 2, the front end 24e of the transmission shaft 24 is inserted into the central hole of the rotary shaft 20c. As shown in FIG. 3, the front end 64c of the transmission shaft 64 is inserted into the central hole of the rotary shaft 60c. Accordingly, the amount of projection of the transmission shafts 24 and 64 in the vehicle front-rear direction can be suppressed. As shown in FIG. 1, the length L1 of the left counter gear chamber 15L and the right counter gear chamber 15R can be reduced. The size of the drive device 10 can be reduced.

In the drive device 10 of the present embodiment, in the left drive system 90L, the rotary shaft 20c and the transmission shaft 24 can be lubricated or cooled by the same lubricant. Similarly, in the right drive system 90R, the rotary shaft 60c and the transmission shaft 64 can be lubricated or cooled by a common lubricant. It is possible to efficiently circulate the lubricating oil.

Although the embodiments have been described in detail above, the embodiments are merely examples and do not limit the scope of claims. The techniques described in the claims include various modifications and alterations of the specific examples illustrated above. The technical elements described in this specification or in the drawings may be used alone or in various combinations, and are not limited to the combinations described in the claims at the time of filing. Further, the technology illustrated in the present specification or the drawings achieves a plurality of objects at the same time, and has technical usefulness by achieving one of the objects.

Modifications

The transmission shafts 24 and 64 may be located anywhere within the area R2 between the counter shafts 23 and 63. For example, in a top view, the transmission shaft 24 of the left drive system 90L may be disposed between the rotary shaft 20c and the counter shaft 23. The transmission shaft 64 of the right drive system 90R may be disposed between the rotary shaft 60c and the counter shaft 63. Accordingly, the length L1 of the counter gear chamber in the front-rear direction can be reduced.

Each of the rotary shaft 20c and 60c is not limited to a form in which a plurality of shafts is fitted, and may be, for example, a single shaft.

The front end of each of the transmission shafts 24 and 64 may not be inserted into the central bore of each of the rotary shaft 20c and 60c. Here, the front end of each of the transmission shafts 24 and 64 and the rear end of each of the rotary shaft 20c and 60c may be spaced apart.

Each of the rotary shaft 20c and the rear end of 60c may be inserted into a central bore of each of the front ends of the transmission shafts 24 and 64.

The configuration is not limited to a configuration including two independent left drive system 90L and right drive system 90R. The technology of the present specification can also be applied to a configuration in which a common single drive system is used to drive the left and right wheels.

It may be a form that does not include hypoid gears 28 and 68. The rotary shaft 20c and 60c may then extend widthwise of the vehicle.

The rotary shaft 20c is an exemplary first rotary shaft. The rotary shaft 60c is an exemplary second rotary shaft. The counter gear 21 is an example of a first counter gear. The counter shaft 23 is an example of a first counter shaft. The counter gear 61 is an example of a second counter gear. The counter shaft 63 is an example of a second counter shaft. The counter gear 22 is an example of a third counter gear. The transmission shaft 24 is an example of a first transmission shaft. The counter gear 62 is an example of a fourth counter gear. The transmission shaft 64 is an example of a second transmission shaft. The hypoid gear 28 is an example of the first hypoid gear. The drive shaft 27 is an example of a first drive shaft. Hypoid gear 68 is an example of a second hypoid gear. The drive shaft 67 is an example of a second drive shaft. The oil seal 26 is an example of a first oil seal. The oil seal 66 is an example of a second oil seal.

What is claimed is:

1. A drive device for a vehicle, comprising:
   a first motor including a first rotary shaft extending in a front-rear direction of the vehicle;
   a second motor including a second rotary shaft extending in the front-rear direction of the vehicle;
   a first counter shaft disposed parallel to the first rotary shaft and connected to the first rotary shaft via a first counter gear;
   a second counter shaft disposed parallel to the second rotary shaft and connected to the second rotary shaft via a second counter gear;
   a first transmission shaft disposed parallel to the first counter shaft and connected to the first counter shaft via a third counter gear;
   a second transmission shaft disposed parallel to the second counter shaft and connected to the second counter shaft via a fourth counter gear;
   a first drive shaft extending in a vehicle width direction of the vehicle and including one end connected to the first transmission shaft via a first hypoid gear and another end connected to a left wheel; and
   a second drive shaft extending in the vehicle width direction of the vehicle and including one end connected to the second transmission shaft via a second hypoid gear and another end connected to a right wheel,
   wherein in a plan view in a vertical direction of the vehicle,
   the first rotary shaft and the second rotary shaft are positioned between the first counter shaft and the second counter shaft in the vehicle width direction of the vehicle, and
   the first transmission shaft and the second transmission shaft are positioned between the first counter shaft and the second counter shaft in the vehicle width direction of the vehicle.

2. The drive device according to claim 1, wherein:
   the first rotary shaft and the first transmission shaft are positioned coaxially; and
   the second rotary shaft and the second transmission shaft are positioned coaxially.

3. The drive device according to claim 2, wherein:
   the first rotary shaft and the second rotary shaft are hollow;
   the first transmission shaft includes one end inserted into the first rotary shaft; and
   the second transmission shaft includes one end inserted into the second rotary shaft.

4. The drive device according to claim 3, wherein:
   the first transmission shaft and the second transmission shaft are hollow;
   the drive device further includes:
   a first oil seal that seals a space between an outer peripheral surface of the first transmission shaft and an inner peripheral surface of the first rotary shaft; and
   a second oil seal that seals a space between an outer peripheral surface of the second transmission shaft and an inner peripheral surface of the second rotary shaft;
   a first oil passage is defined by the first rotary shaft and the first transmission shaft; and
   a second oil passage is defined by the second rotary shaft and the second transmission shaft.

5. The drive device according to claim 1, wherein:
   the first hypoid gear includes a first drive gear fixed to the first transmission shaft, and a first side gear fixed to the first drive shaft;

the second hypoid gear includes a second drive gear fixed to the second transmission shaft, and a second side gear fixed to the second drive shaft; and in the plan view in the vertical direction of the vehicle, the first side gear and the second side gear are positioned between the first transmission shaft and the second transmission shaft in the vehicle width direction of the vehicle.

* * * * *